June 28, 1927.
R. RIEHL
1,633,606
VEHICLE WHEEL
Filed March 26, 1926
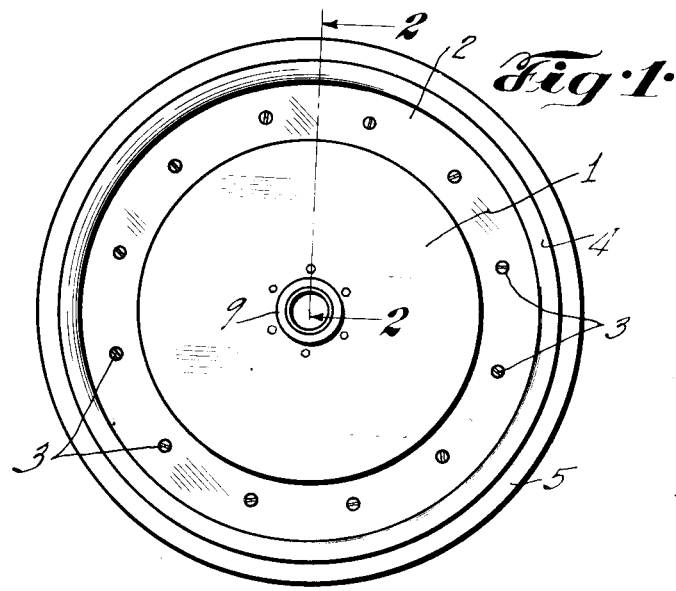
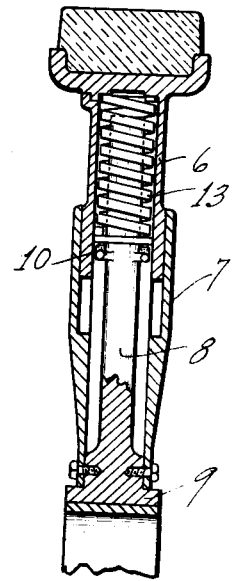
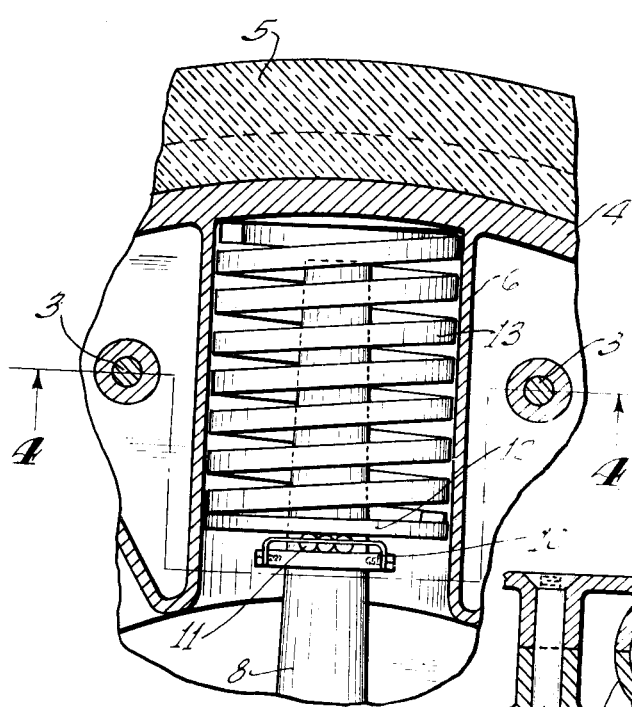
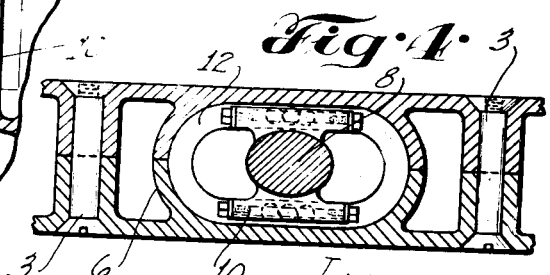
INVENTOR
Robert Riehl.
By W. L. Dempsey,
ATTORNEY Patented June 28, 1927.

1,633,606

UNITED STATES PATENT OFFICE.

ROBERT RIEHL, OF ST. LOUIS, MISSOURI.

VEHICLE WHEEL.

Application filed March 26, 1926. Serial No. 97,650.

My invention relates to vehicle wheels, and specifically to auto vehicle wheels, in which the hub is resiliently mounted within the rim of the wheel.

The object of my invention is to produce a wheel for auto vehicles in which the hub is resiliently mounted within the rim of wheel in such a way that the shock of the road will be effectively dampened.

Another object of my invention is to provide a spring wheel that can be cheaply constructed and that is durable and effective.

Other objects and advantages of my invention will be obvious from the description, claim and drawings, in which:

Fig. 1 is a side view of the wheel.

Fig. 2 is a section along the line 2—2 in Fig. 1.

Fig. 3 is a sectional view of a portion of the wheel taken in the median plane of the same.

Fig. 4 is a cross-section of Fig. 3 along the line 4—4.

This my present invention is an improvement upon my invention as described in United States Patent No. 1,003,123, issued Sept. 12, 1911.

Many attempts have been made to produce a vehicle wheel in which the hub of the wheel is resiliently supported within the rim, as it is well known that heavily laden trucks, having wheels provided with either steel or solid rubber tires, transmit the jar and shock of the road to the axles of the truck, causing them to crystallize and break.

To overcome these defects, various attempts have been made to interpose a shock-absorbing medium between the axle and the rim of the wheel.

In some cases, solid rubber inserts have been used with the result that while successful for a time, the rubber soon loses its elasticity with wear and age and, therefore, requires frequent renewal, at large expense.

Other attempts have been made in which various types and kinds of springs have been placed between the hub and rim of the wheel. In some cases the type of springs used has been such that they are easily broken by contacting with curbs and other obstacles; and, besides, they gather dirt, dust and mud from the road.

To overcome these objections, I have designed a wheel which when completed, as indicated in Fig. 1, is completely enclosed with a dirt, dust, and waterproof outer casing, which is composed of a central portion 1, and a re-inforcing member 2, firmly held in place by means of bolts or rivets 3, so that when the wheel is completely assembled, no dirt or dust can enter its interior.

A rim 4 of suitable shape is provided with a tire 5, and joined to a plurality of hollow housings 6, which said hollow housings are adapted to reciprocate with an additional hollow housing 7, which is composed of two circular plates securely bolted or riveted to the spokes 8, at a point in close proximity to the hub 9, which is integral with the spokes 8.

At a suitable pre-determined distance from the ends of the spokes a ball raceway 10 is provided, which may be bolted or riveted to the spoke. A plurality of balls 11 are provided and disposed between the raceway 10 and a suitable washer 12, which in turn rests upon the helical spring 13.

The purpose of the balls 11 is to reduce the friction and permit a limited angular movement of the spokes 8 about the hub and within the springs 13,—thus a dual movement of the hub is provided for.

One of the movements permits a slight rotative movement about the axle, and the other permits a limited vertical motion by means of the resiliency of the helical springs, thereby dampening and relieving the axles of any shock or jar that might be exerted against the periphery of the wheel, either in a horizontal or vertical plane, so that under all circumstances and conditions, the axle will not be subjected to jar and vibration, which is such a fruitful source of crystallization and breaking of axles.

My construction further complements and supplements the action and effect of the normal vehicle spring.

It is evident that if the spokes were limited only to a vertical movement, when the wheel was subjected to violent shock in a horizontal plane, as when backing a truck against a curb, the shock would be transferred directly to the axle, which would tend to cause it to crystallize.

Having fully described my invention, what I claim as new and useful and desire to secure by Letters Patent is:—

A vehicle wheel of the class described, comprising an outer rim provided with inwardly projecting hollow housings, converging toward a common center and adapted to reciprocate within radially disposed hollow housing, radiating from a centrally located hub, a plurality of radially disposed spokes connected to said hub and of sufficient length to protrude through the said radially disposed housing into the said first-mentioned housings projecting inwardly from said rim, ball raceways firmly affixed to said spokes, balls in said raceways adapted to be held in said raceways by a suitable washer, slidably surrounding said spokes, helical compression springs surrounding said spokes, one end abutting against said washer and the opposite end abutting against said rim, a hollow hub providing an axle bearing, enclosing sides constituting the aforesaid radially disposed housing, and rigidly joined to said hub, rigidly joined to prevent the ingress of dust and dirt, as set forth in the drawings and specifications.

In witness whereof I have hereunto affixed my signature this 30th day of January, 1926.

ROBERT RIEHL.